United States Patent
Ayash et al.

(10) Patent No.: US 9,542,137 B2
(45) Date of Patent: Jan. 10, 2017

(54) IMAGE SHIFT TEMPLATE

(71) Applicant: XEROX CORPORATION, Norwalk, CT (US)

(72) Inventors: Barry K. Ayash, Webster, NY (US); Mark A. Rule, Rochester, NY (US); James E. Quigley, Manchester, NY (US)

(73) Assignee: Xerox Corporation, Norwalk, CT (US)

(*) Notice: Subject to any disclaimer, the term of this patent is extended or adjusted under 35 U.S.C. 154(b) by 75 days.

(21) Appl. No.: 14/154,210

(22) Filed: Jan. 14, 2014

(65) Prior Publication Data
US 2015/0199158 A1 Jul. 16, 2015

(51) Int. Cl.
*G06K 15/00* (2006.01)
*G06F 3/12* (2006.01)
*H04N 1/00* (2006.01)

(52) U.S. Cl.
CPC ............ *G06F 3/1242* (2013.01); *G06F 3/125* (2013.01); *G06F 3/1208* (2013.01); *G06F 3/1285* (2013.01); *H04N 1/0044* (2013.01)

(58) Field of Classification Search
CPC .. H04N 1/387; H04N 1/3872; H04N 1/00442; H04N 1/00456; H04N 1/00466; H04N 1/0044; H04N 1/00482; H04N 1/00413; H04N 1/00639; H04N 1/233; H04N 1/2384; G03G 15/6544; G03G 2215/00827; G06F 3/1257; G06F 17/048; G06F 17/212; G06F 3/04875; G06F 3/1208; G06F 3/1242; B65H 2701/1912; B65H 35/02; B65H 35/04; G06K 15/1843

USPC ............................................... 358/1.18, 1.19
See application file for complete search history.

(56) References Cited

U.S. PATENT DOCUMENTS

| | | | |
|---|---|---|---|
| 5,732,230 | A | 3/1998 | Cullen et al. |
| 5,793,887 | A | 8/1998 | Zlotnick |
| 6,134,568 | A | 10/2000 | Tonkin |
| 6,407,820 | B1 | 6/2002 | Hansen et al. |
| 6,694,487 | B1 | 2/2004 | Ilsar |
| 7,064,858 | B2 | 6/2006 | Iwai et al. |
| 7,268,910 | B2 | 9/2007 | Catt et al. |
| 7,536,306 | B2 | 5/2009 | Ogawa |
| 8,189,230 | B2 | 5/2012 | Yamaguchi |
| 8,218,197 | B2 * | 7/2012 | Chiba et al. ............ 358/1.9 |
| 8,284,423 | B2 | 10/2012 | Jahn et al. |

(Continued)

*Primary Examiner* — Benny Q Tieu
*Assistant Examiner* — Juan M Guillermety
(74) *Attorney, Agent, or Firm* — Gibb & Riley, LLC (57) ABSTRACT

Devices and methods for an image shift template. Information defining a document and a first print job is received into a printer. The first print job comprises instructions for printing the document and document finishing instructions. The finishing instructions are analyzed and areas of the pages of the document that will be unusable after a finishing operation according to the instructions are identified. Selection is received to print an image shift template on the document. The image shift template comprises x- and y-axes associated with the document and indication of the areas of the pages of the document that will be unusable after the finishing operation. A second print job is created comprising instructions for printing the pages of the document with the image shift template superimposed on the pages. The pages of the document including the image shift template are printed, according to the second print job.

20 Claims, 11 Drawing Sheets

(56) References Cited

U.S. PATENT DOCUMENTS

| | | |
|---|---|---|
| 8,526,044 B2 | 9/2013 | Dumitrescu et al. |
| 8,913,255 B2 * | 12/2014 | Kido ................ G06F 3/1256 358/1.11 |
| 9,021,351 B2 * | 4/2015 | Takekawa .......... H04N 1/00456 358/1.15 |
| 2002/0090223 A1 * | 7/2002 | Ohtani ............................ 399/82 |
| 2003/0112453 A1 | 6/2003 | Swihart |
| 2005/0062988 A1 | 3/2005 | Schultz et al. |
| 2007/0139707 A1 * | 6/2007 | Takami et al. ............... 358/1.15 |
| 2008/0043283 A1 * | 2/2008 | Takeda ........................ 358/1.15 |
| 2010/0157326 A1 * | 6/2010 | Mori ............................. 358/1.5 |
| 2010/0245872 A1 | 9/2010 | Narita |
| 2011/0299722 A1 * | 12/2011 | Schaede ................ B65H 35/04 382/100 |
| 2013/0155423 A1 * | 6/2013 | Shibata ......................... 358/1.2 |
| 2013/0250344 A1 * | 9/2013 | Merriam et al. ............. 358/1.15 |
| 2014/0185062 A1 * | 7/2014 | Li ........................ H04N 1/3872 358/1.2 |

* cited by examiner

IMAGE SHIFT TEMPLATE

BACKGROUND

Devices and methods herein generally relate to machines such as printers and/or copier devices and, more particularly, to methods to provide an image alignment template on an output document.

Sometimes, when printing a document, it is important that the front and back sides are perfectly aligned (e.g. book publishing); it is very hard to adjust the alignment without any other tools. In some finishing operations, a portion of one or more pages of the document may be unusable due to the finishing process. There is no easy way to determine how to perform an image shift on a print output device in order to avoid unusable areas. The process is time consuming to figure out which are the x- or y-axes and the positive or negative direction, in addition to identifying what page in the job needs to be adjusted and what portions of a page, if any, are unusable. The process ends up being a trial and error procedure with many print runs of the job before correct final expected result are achieved, which is a waste of time and money.

SUMMARY

Disclosed herein is a printer feature that prints actual document images overlaid with image shift scales enabling the operator to see from the printed output the direction and magnitude of image shift parameters to enter at the printer user interface in order to achieve the desired printed output. The output may also be overlaid with page numbers, facilitating page exception programming when different image shifts are used for different job pages.

According to a method herein, a document is received into a document output device. A first print job is received into the document output device. The first print job comprises instructions for printing pages of the document using the document output device and document finishing instructions. The document finishing instructions are analyzed and areas of the pages of the document that will be unusable after a finishing operation according to the document finishing instructions are identified. Selection is received, on a user interface of the document output device, to print an image shift template on the pages of the document. The image shift template comprises x- and y-axes associated with the document and indication of the areas of the pages of the document that will be unusable after the finishing operation according to the document finishing instructions. A second print job is created comprising instructions for printing the pages of the document with the image shift template superimposed on the pages of the document using the document output device. The pages of the document including the image shift template are printed on the document output device, according to the second print job.

According to a computer-implemented method herein, a document is received into a document output device having a processor. A first print job is received into the processor of the document output device. The first print job comprises instructions for printing pages of the document using a print engine of the document output device and document finishing instructions. Images of pages of the document according to the first print job are displayed, on a user interface operatively connected to the processor. Direction to display an image shift template superimposed on the images of the pages of the document is received, on the user interface. Responsive to receiving the direction to display an image shift template superimposed on the images of the pages of the document, the processor analyzes the document finishing instructions and identifies areas of the pages of the document that will be unusable after a finishing operation according to the document finishing instructions. Images of the pages of the document with the image shift template superimposed on the images of the pages of the document are displayed, on the user interface. The image shift template comprises x- and y-axes associated with the document and indication of the areas of the pages of the document that will be unusable after the finishing operation according to the document finishing instructions. The x- and y-axes comprise calibrated scales along each axis and arrows indicating positive and negative direction along each axis. A second print job is created, using the processor. The second print job comprises instructions for printing the pages of the document with the image shift template superimposed on the pages of the document, using the print engine of the document output device. At least a portion of the document with the image shift template is printed, using the document output device, according to the second print job.

According to a printing device, a processor has a print engine operatively connected to the processor and a user interface operatively connected to the processor. The processor receives a document into the printing device. The processor receives a first print job into the document output device. The first print job comprises instructions for printing pages of the document using the printing device and document finishing instructions. The processor analyzes the document finishing instructions and identifies areas of the pages of the document that will be unusable after a finishing operation according to the document finishing instructions. The processor receives, from the user interface, selection to print an image shift template on the pages of the document. The image shift template comprises x- and y-axes associated with the document and indication of the areas of the pages of the document that will be unusable after the finishing operation according to the document finishing instructions. The processor creates a second print job comprising instructions for printing the pages of the document with the image shift template superimposed on the pages of the document using the printing device. The processor directs the print engine to print at least a portion of the pages of the document including the image shift template, according to the second print job.

These and other features are described in, or are apparent from, the following detailed description.

BRIEF DESCRIPTION OF THE DRAWINGS

Various examples of the devices and methods are described in detail below, with reference to the attached drawing figures, which are not necessarily drawn to scale and in which.

DETAILED DESCRIPTION

The disclosure will now be described by reference to a printing apparatus that includes a user interface that enables image shifting in the output of the printing apparatus. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

For a general understanding of the features of the disclosure, reference is made to the drawings. In the drawings, like reference numerals have been used throughout to identify identical elements.

According to devices and methods herein, a print job for a printing device is created that superimposes an image shift template over a current print job. The new print job lays out the x- and y-axes and the positive or negative direction for the axes. The new print job also includes page numbers so if just one page (page exception) is to be image shifted, an operator could easily select the proper page in the job and perform the image shift in the x- or y-direction. For document finishing jobs that include binding, the new print job shows the gluing margin delineating a binding area of the document. This new image shift template job would then be printed out and used to help perform the image shift in the job.

Figure 1:
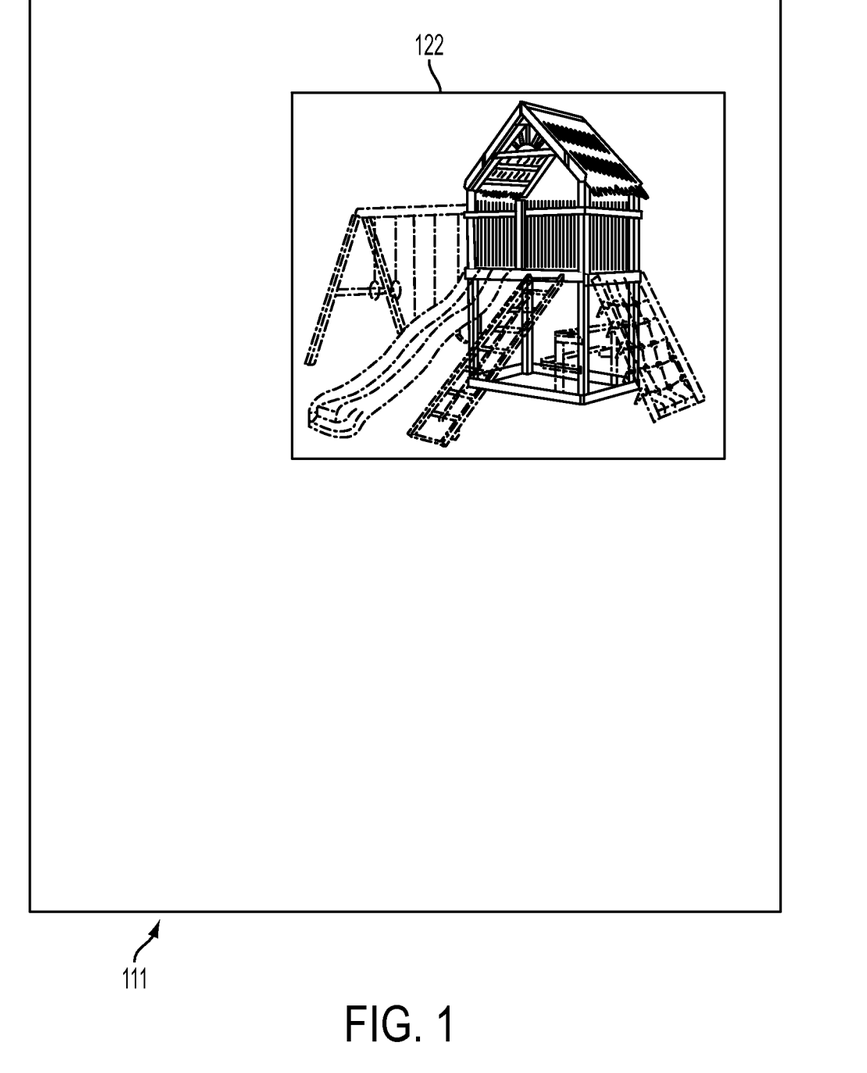
FIG. 1 is a plan view of a document sheet with an image according to devices and methods herein.

A typical printed page will contain an image having text and/or graphical information that represent the desired document after printing. An image of the desired output may be displayed on a user interface before printing using a viewing functionality software application. FIG. 1 shows an example of a sheet, indicated generally as 111, of a document according to devices and methods herein. The document may include one or more sheets. In the example of FIG. 1, the sheet 111 includes an image 122 based on information defining the pages of the document. The sheet 111 may comprise paper, transparencies, or other medium. Additionally, the sheet may be configured with pre-punched holes, tabs, and the like. In the example of FIG. 1, the image 122 may be located on a specific page, and the image 122 may need to be adjusted away from a specific area, such as a binding area if the document is intended to go into a binder.

According to devices and methods herein, the document is intended to be printed or otherwise reproduced by a document output device. The document output device can comprise, for example, a printer, copier, multi-function machine, etc. The document output device receives a document into the document output device. A first print job is received into the document output device. The first print job comprises instructions for printing each sheet 111 of the document using the document output device. The first print job also includes document finishing instructions. The document finishing instructions analyzed and areas of the pages of the document that will be unusable after a finishing operation according to the document finishing instructions are identified.

The document output device may include a button or other selector device on a user interface of the document output device, which can be selected to provide an image shift template. When the button is pressed, the first print job is modified, as described herein. That is, a second print job is created superimposing an image shift template on the sheet 111. The sheet 111 is printed by the document output device, including the image shift template, according to the second print job.

Figure 2:
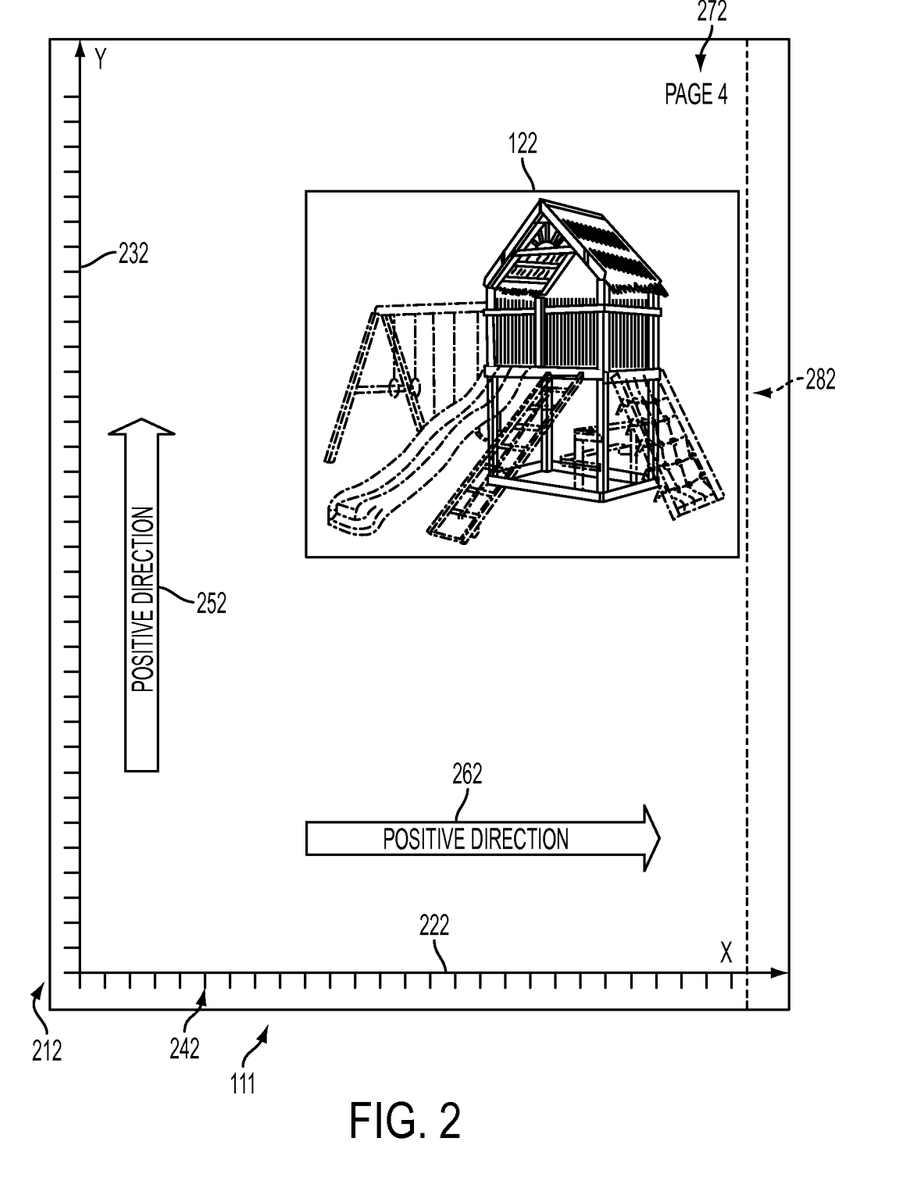
FIG. 2 is a plan view of the document sheet of FIG. 1 with an image shift template according to devices and methods herein.

Referring to FIG. 2, an example of an image shift template 212 is superimposed on the sheet 111. The image shift template 212 comprises an x-axis 222 and a y-axis 232 associated with the document. The x-axis 222 and y-axis 232 may include gradations 242 and labels indicating the x and y directions. The gradations 242 may be in metric or English delineations. Additionally, as would be known to one skilled in the art, the gradations 242 may be in points in which 72 points=1 inch. The image shift template 212 may also include arrows, such as 252, 262, indicating the positive and negative direction along the x-axis 222 and y-axis 232.

It is contemplated that the image shift template 212 may include grid lines crisscrossing the sheet 111; however, in order to avoid clutter in the sheet 111, the image shift template 212 need not include such grid lines. The image shift template 212 may be aligned to different locations on the page, such as either the lower left corner, the center of the page, the lower right corner, the upper left corner or the upper right corner.

The image shift template 212 may also include page numbers 272 indicating pages of the document. The page numbers 272 enable that if only one page (page exception) needs to be image shifted, an operator can easily select the proper page in the job and perform the image shift in the x- or y-direction for an individual sheet 111.

According to devices and methods herein, the image shift template 212 includes an indication of an unusable area 282 of the pages of the document. It may be impracticable to print in the unusable area 282 due to the document finishing instructions. For example, the finishing operation may hide a portion of the areas of the sheet 111, such as an indication of a gluing margin delineating a binding area of the sheet 111. The size of the unusable area 282 may be selectable based on the number of sheets in the document. In addition, the location of the unusable area 282 depends on the size and direction of the sheet 111, as well as whether the sheet 111 is for an even or odd numbered page.

Figure 3A:
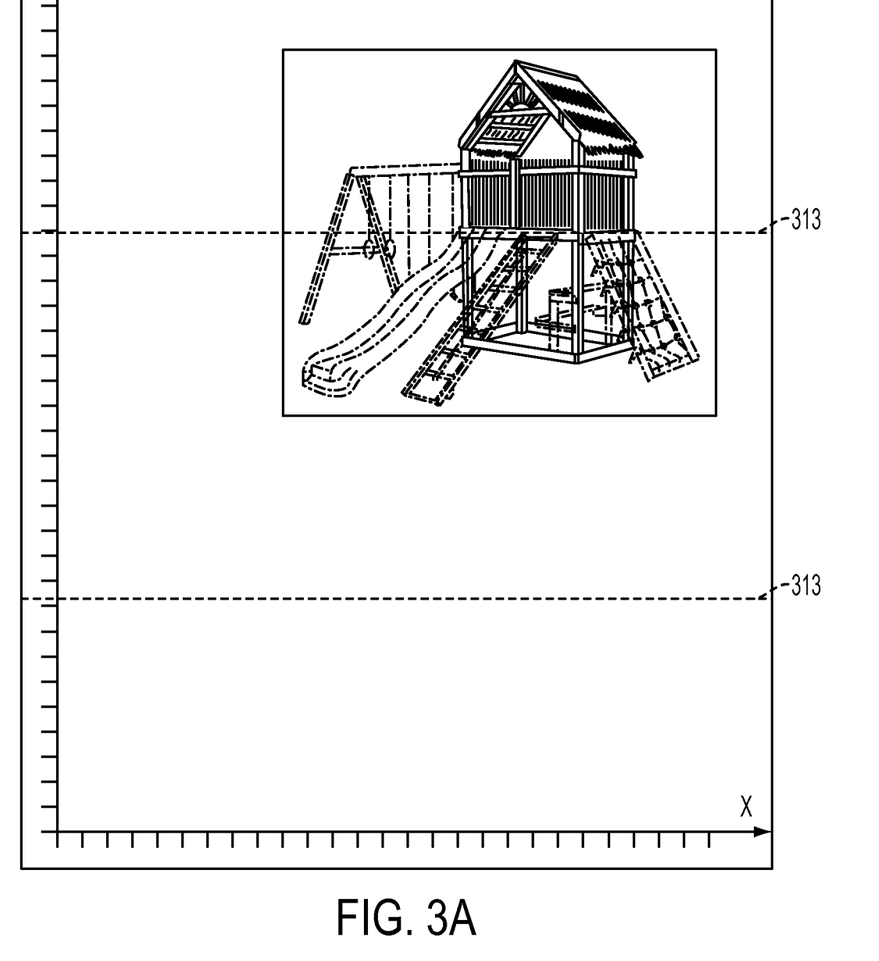
FIGS. 3A-3D show examples of various image shift templates according to devices and methods herein.
Figure 3B:
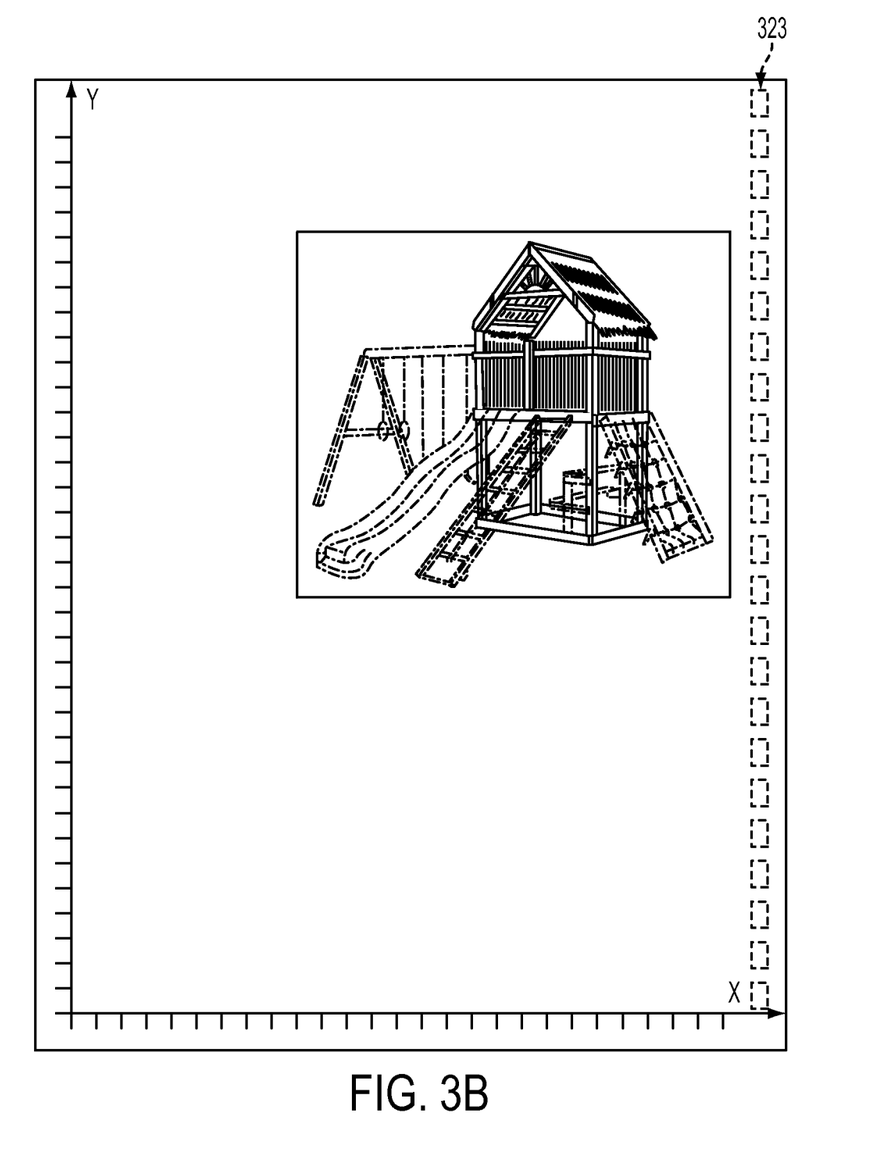
Figure 3C:
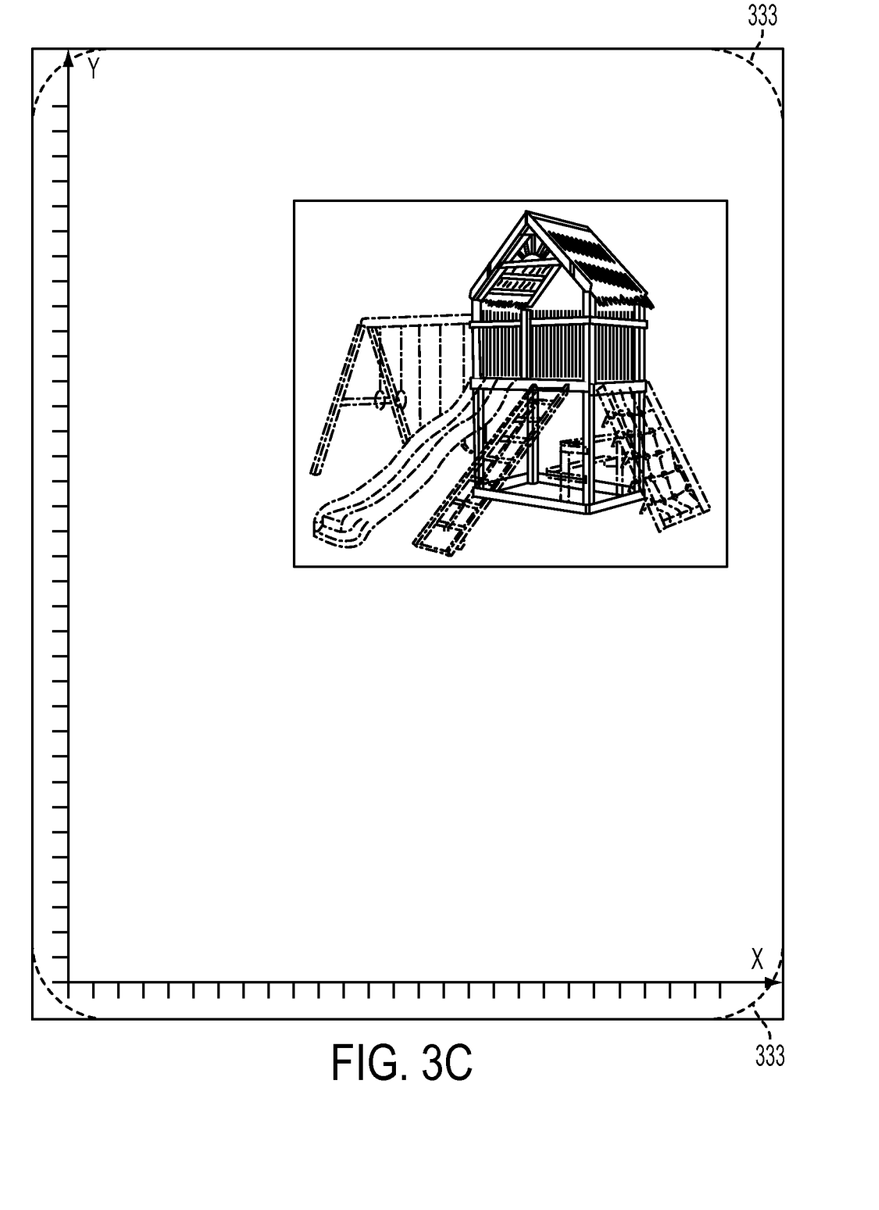
Figure 3D:
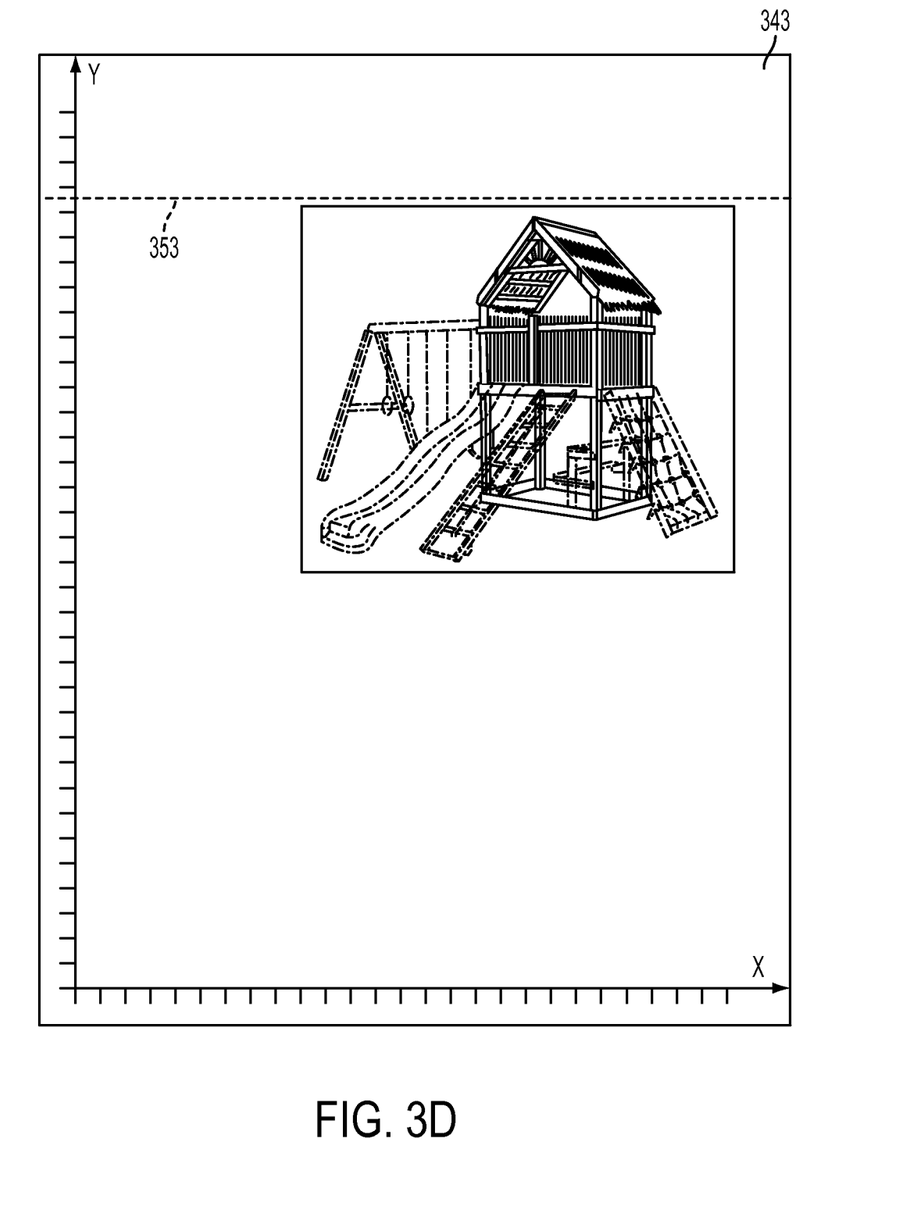

The unusable area 282 may result from a variety of finishing operations, such as gluing, bonding, stapling, binding, and/or cutting. FIGS. 3A-3D show various examples of image shift templates according to devices and methods herein. For example, FIG. 3A shows fold lines 313 for a finishing operation that involves folding. Folding converts a flat printed sheet into a pamphlet, tent card (one fold), z-fold (two folds) leaflet, and many other applications. Lighter stocks can be simply folded; heavier stocks may also require a crease operation in addition to the fold in order to complete the application correctly. FIG. 3B shows areas 323 that will be punctured for a finishing operation that involves comb binding to bind pages together into a book. A hole puncher will make rectangular holes in the sheet. FIG. 3C shows areas 333 that will be unusable if round cornering is used to 'round' the corners of a printed sheet 111 in the document finishing operation. FIG. 3D shows an area 343 that may be unusable if the finishing operation involves perforating. Perforating allows detachable tear off sections indicated by perforation line 353. More than one straight perforation line 353 can be used according to specific finishing operations, only limited by the size of the sheet 111.

The image shift template 212 according to devices and methods herein, enables an operator to print additional information on some job pages without interfering with other page elements in order to determine what image shift parameters are to be entered. Features of the devices and methods herein enable the operator to specify where the image shift template information should be printed relative to the document image. According to devices and methods herein, the image shift template 212 may also provide the capability to select different alignment configurations for odd and even pages.

A second print job is created comprising instructions for printing the pages of the document with the image shift template 212 superimposed on the pages of the document using the document output device. The pages of the document including the image shift template 212 are printed on the document output device, according to the second print job. FIG. 2 shows an example of a sheet 111 with an image 122 that needs to be shifted according to the image shift template 212. If the printed output, such as shown in FIG. 2, indicates misalignment or other need to shift the image, the operator can shift the image in a positive or negative direction by the amount indicated on the x- and y-axes 222, 232. According to devices and methods herein, the image shift template 212 may be selectable based on page size and/or page orientation.

Figure 4:
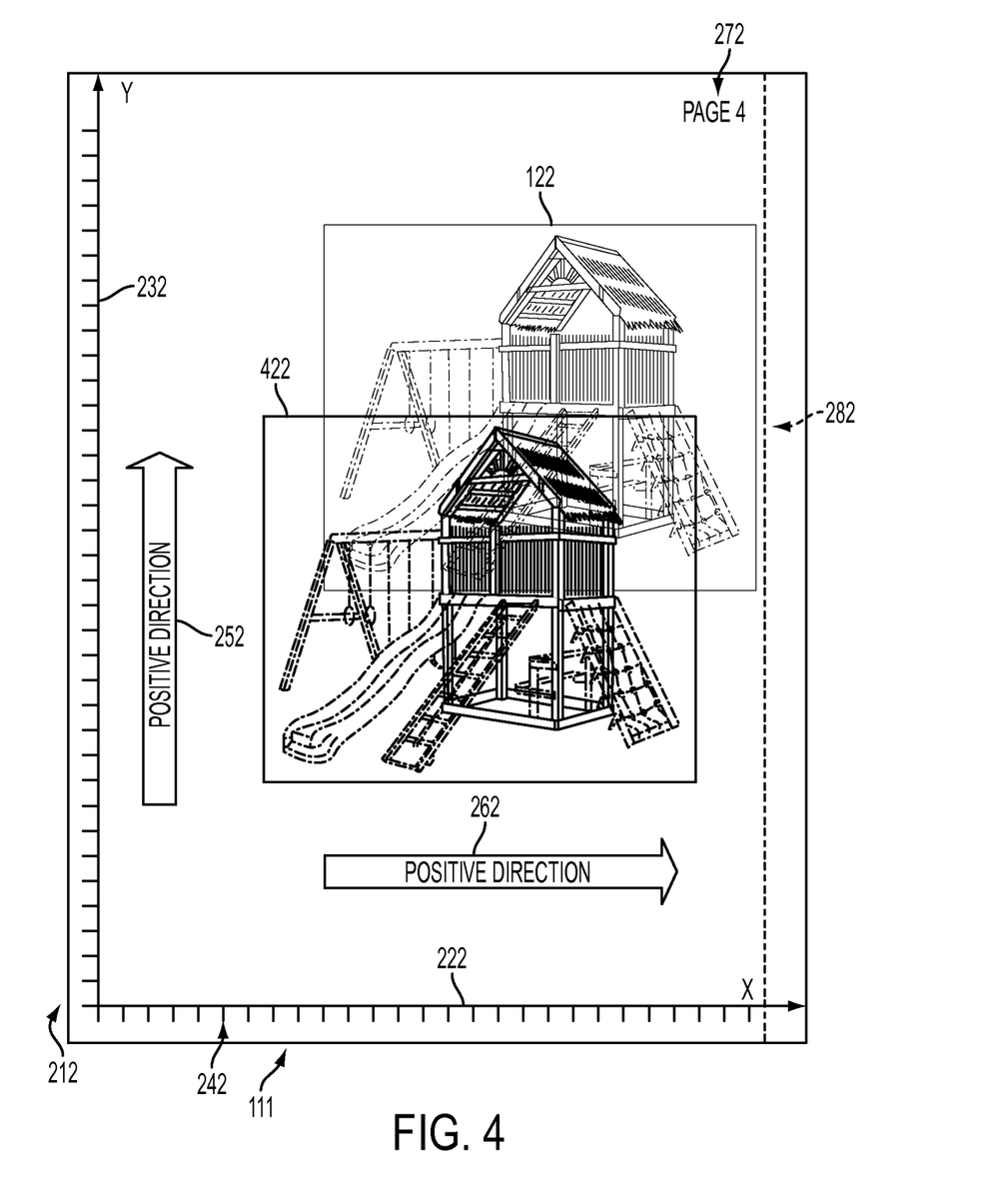
FIG. 4 is a plan view of the document sheet of FIG. 2 showing an image shift according to devices and methods herein.

FIG. 4 shows an example of the sheet 111 with the image 122 that needs to be shifted according to the image shift template 212. In FIG. 4, the image 122 has been shifted away from the unusable area 282 to a new position 422. An operator can input specific parameters according to the gradations 242 on the x- and y-axes 222, 232 in order to edit the document by moving the image 122 to a desired position. The image shift template 212 is particularly useful when the user works with a document having front/back alignment, or adjustments of trim positions.

Figure 5:
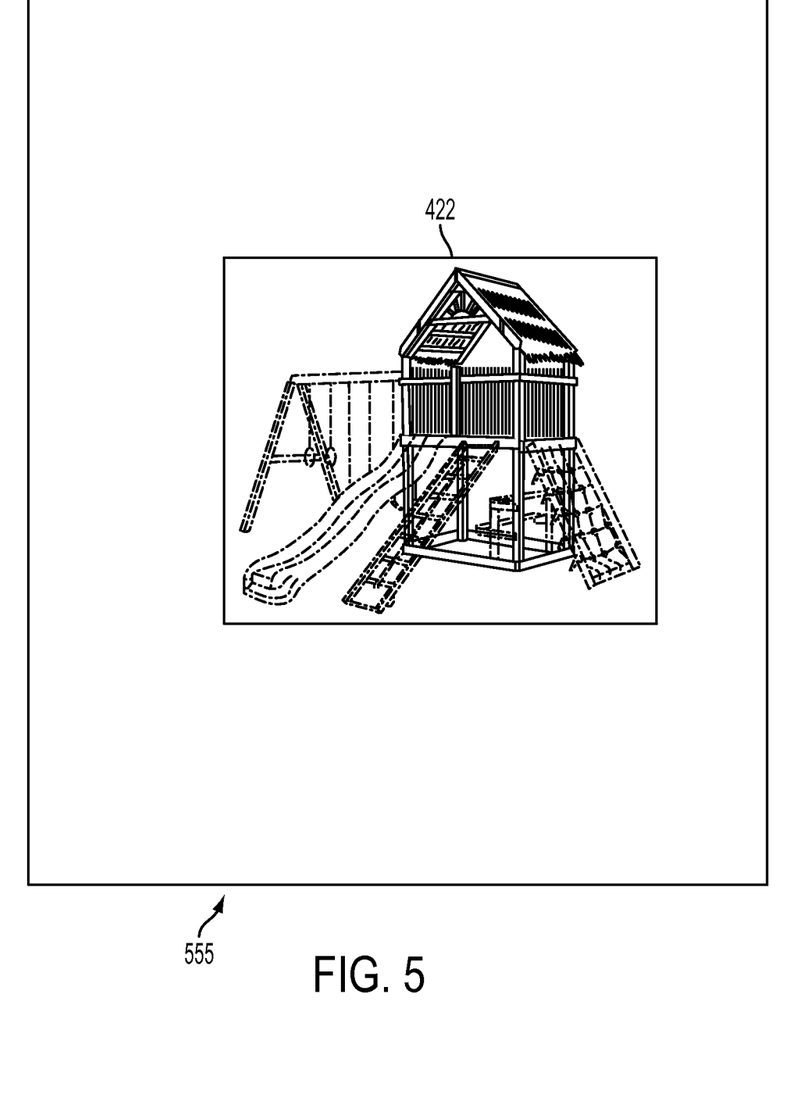
FIG. 5 is a plan view of a document sheet with an image according to devices and methods herein.

By shifting an image on a page of the document according to the image shift template 212 produces an image-shifted document. In FIG. 5, a corrected sheet 555 from an image-shifted document is shown with the image in the new position 422, without the image shift template 212. After the document has been checked and alignment corrections have been applied. The image shift template 212 function may be turned off in a final print job and the image-shifted document can be printed with all pages in proper alignment for binding or other applications.

Figure 6:
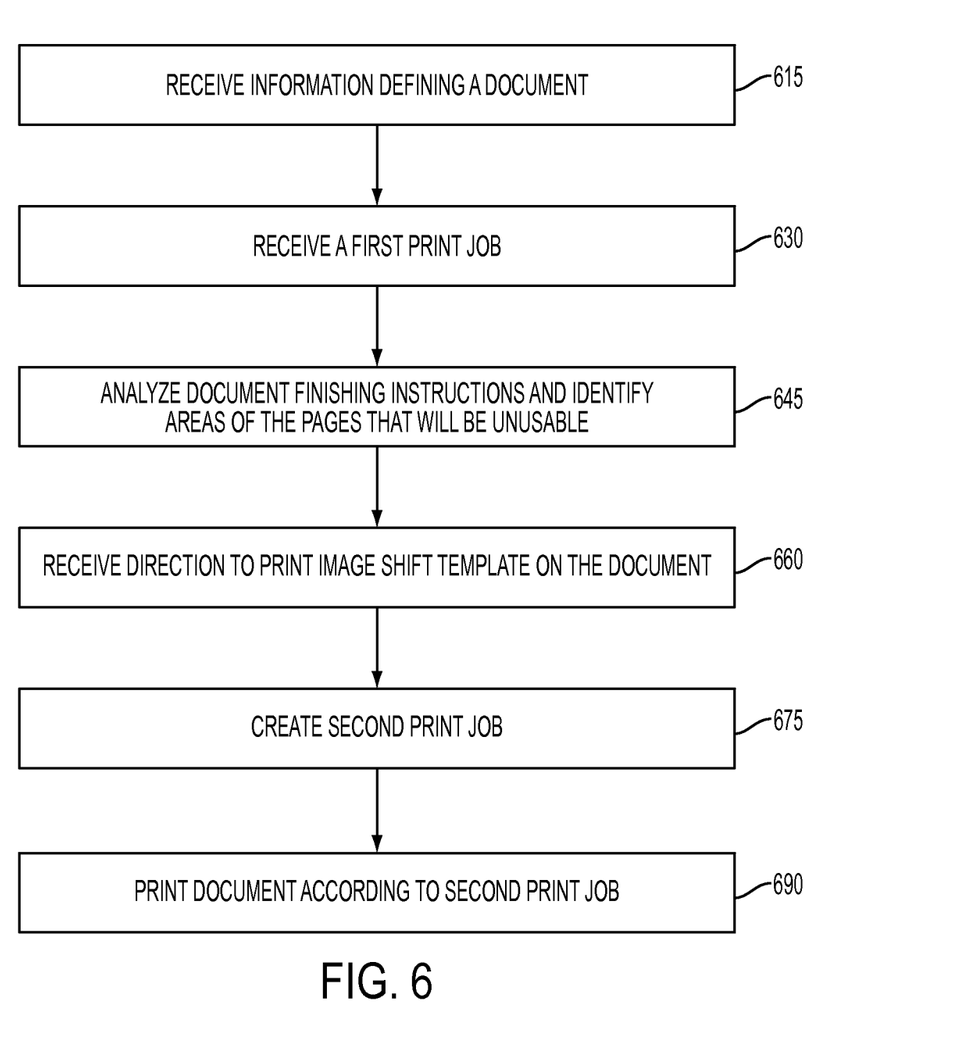
FIG. 6 is a flow diagram illustrating methods herein.

FIG. 6 is a flow diagram illustrating the processing flow of an exemplary method according to devices and methods herein. At 615, information defining a document is received into a document output device having a processor. At 630, first print job is received into the processor of the document output device. The first print job comprises instructions for printing pages of the document using a print engine of the document output device and document finishing instructions. At 645, the processor analyzes the document finishing instructions and identifies areas of the pages of the document that will be unusable after a finishing operation according to the document finishing instructions. At 660, selection is received, on a user interface of the document output device, to print an image shift template on the pages of the document. The image shift template comprises x- and y-axes associated with the document and indication of the areas of the pages of the document that will be unusable after the finishing operation according to the document finishing instructions. A second print job is created, using the processor, at 675. The second print job comprises instructions for printing the pages of the document with the image shift template superimposed on the pages of the document, using the print engine of the document output device. At 690, at least a portion of the document with the image shift template is printed, using the document output device, according to the second print job.

Figure 7:
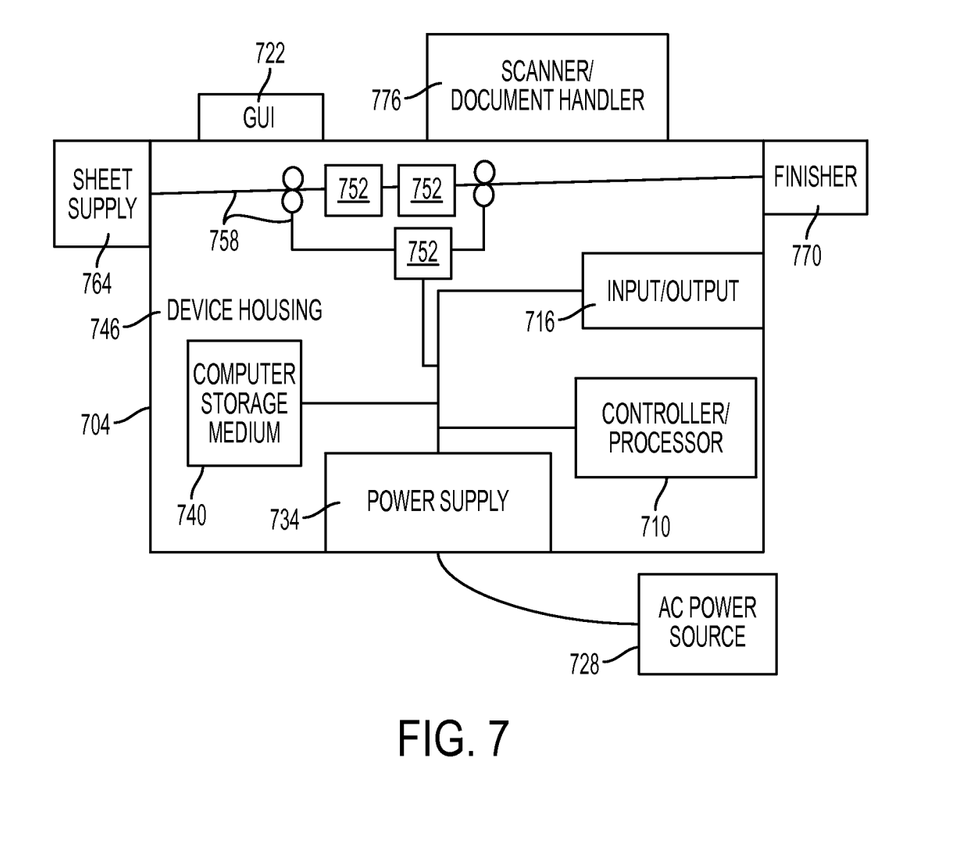
FIG. 7 is a side-view schematic diagram of a multi-function device according to devices and methods herein.
Figure 8:
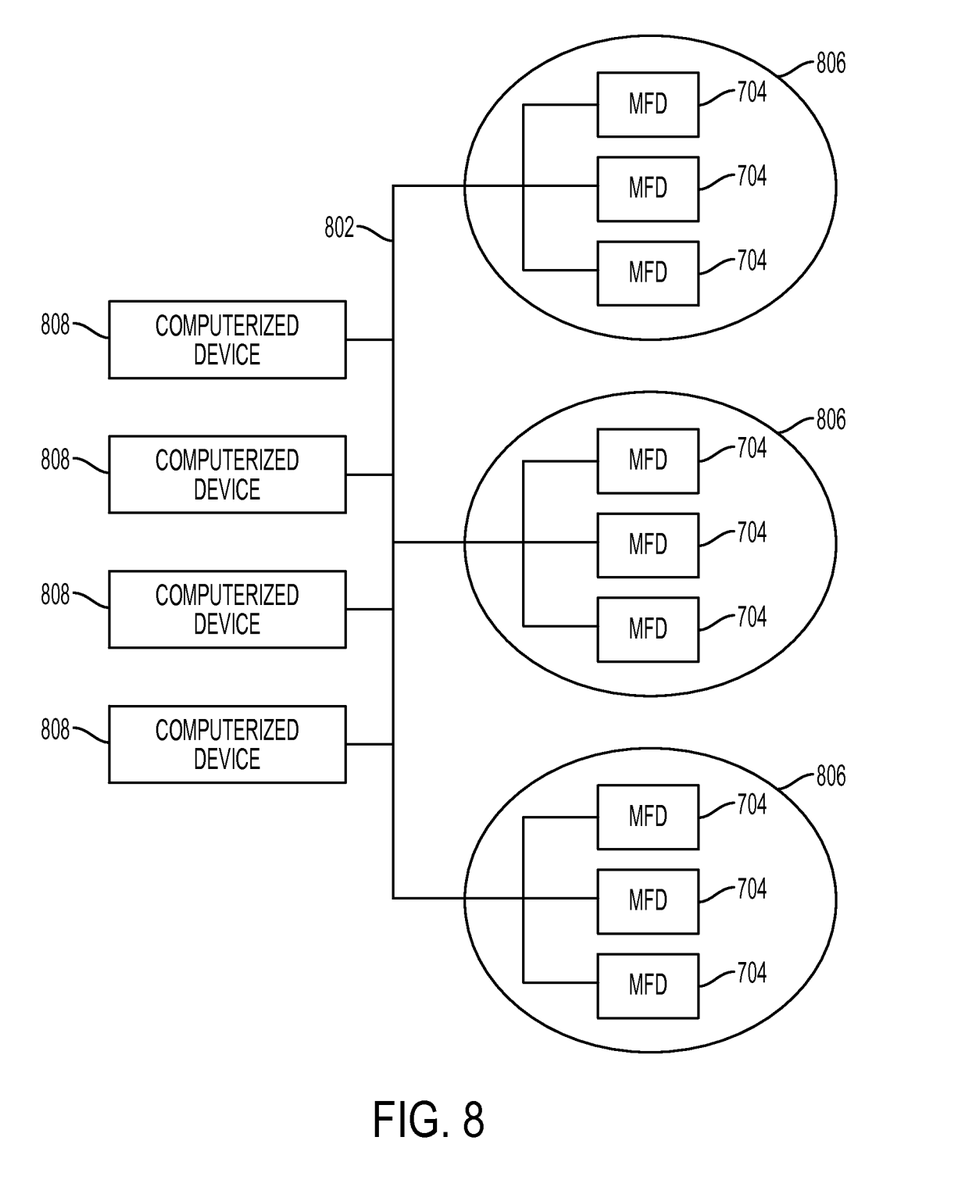
FIG. 8 is a schematic diagram illustrating devices and methods herein.

FIG. 7 illustrates a multi-function device 704 that can be used with devices and methods herein and can comprise, for example, a printer, copier, multi-function machine, etc. The multi-function device 704 includes a controller/processor 710 and a communications port (input/output) 716 operatively connected to the controller/processor 710 and to a network 802 external to the multi-function device 704, as shown in FIG. 8. In addition, the multi-function device 704 can include at least one accessory functional component, such as a graphic user interface (GUI) assembly 722 that operates on the power supplied from the AC power source 728, which may be external to the multi-function device 704. The AC power source 728 may provide electrical power through the power supply 734.

The controller/processor 710 controls the various actions of the multi-function device 704. A non-transitory computer storage medium device 740 (which can be optical, magnetic, capacitor based, etc.) is readable by the controller/processor 710 and stores instructions that the controller/processor 710 executes to allow the multi-function device 704 to perform its various functions, such as those described herein. Thus, as shown in FIG. 7, a device housing 746 has one or more functional components that operate on power supplied from the AC power source 728 by the power supply 734. The power supply 734 can comprise a power storage element (e.g., a battery) and connects to the AC power source 728, which may be external to the multi-function device 704. The power supply 734 converts the external power into the type of power needed by the various components.

The multi-function device 704 includes at least one marking device (print engines) 752 operatively connected to the controller/processor 710, a media path 758 positioned to supply sheets of media from a sheet supply 764 to the marking device(s) 752, etc. After receiving various markings from the print engine(s), the sheets of media can optionally pass to a finisher 770 which can fold, staple, sort, etc., the various printed sheets. In addition, the multi-function device 704 can include at least one accessory functional component (such as a scanner/document handler 776, etc.) that also operates on the power supplied from the AC power source 728 (through the power supply 734).

As would be understood by those ordinarily skilled in the art, the multi-function device 704 shown in FIG. 7 is only one example and the devices and methods herein are equally applicable to other types of printing devices that may include fewer components or more components. For example, while a limited number of print engines and paper paths are illustrated in FIG. 7, those ordinarily skilled in the art would understand that many more paper paths and additional print engines could be included within any printing device used with devices and methods herein.

As shown in FIG. 8, exemplary printers, copiers, multi-function machines, and multi-function devices (MFD) 704 may be located at various different physical locations 806. Other devices according to devices and methods herein may include various computerized devices 808. The computerized devices 708 can include print servers, printing devices, personal computers, etc., and are in communication (operatively connected to one another) by way of a network 802. The network 802 may be any type of network, including a local area network (LAN), a wide area network (WAN), or a global computer network, such as the Internet.

Aspects of the present disclosure are described herein with reference to flowchart illustrations and/or block diagrams of methods, apparatus (systems), and computer program products according to various devices and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

According to a further device and method herein, an article of manufacture is provided that includes a tangible computer readable medium having computer readable instructions embodied therein for performing the steps of the computer implemented methods, including, but not limited to, the method illustrated in FIG. 6. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIG. 6.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In case of implementing the devices and methods herein by software and/or firmware, a program constituting the software may be installed into a computer with dedicated hardware, from a storage medium or a network, and the computer is capable of performing various functions if with various programs installed therein.

In the case where the above-described series of processing is implemented with software, the program that constitutes the software may be installed from a network such as the Internet or a storage medium such as the removable medium. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM, a hard disk contained in the storage section of the disk units, or the like, which has the program stored therein and is distributed to the user together with the device that contains them.

As will be appreciated by one skilled in the art, aspects of the devices and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a "circuit," "module", or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a Read Only Memory (ROM), an Erasable Programmable Read Only Memory (EPROM or Flash memory), an optical fiber, a magnetic storage device, a portable compact disc Read Only Memory (CD-ROM), an optical storage device, a "plug-and-play" memory device, like a USB flash drive, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods, and computer program products according to various devices and methods herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, print engines, etc., are well known by those ordinarily skilled in the art, and are not described in detail herein to keep this disclosure focused on the salient features presented. The devices and methods herein can encompass devices that print in color, monochrome, or handle color or monochrome image data. All foregoing devices and methods are specifically applicable to electrostatographic and/or xerographic machines and/or processes.

The terminology used herein is for the purpose of describing particular devices and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms 'automated' or 'automatically' mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various devices and methods of the present disclosure have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the devices and methods herein cannot be implied or imported from any above example as limitations to any particular order, number, position, size, shape, angle, color, or material.

What is claimed is:

1. A method comprising:
   receiving a first print job into a document output device, said first print job comprising document finishing instructions and instructions for printing pages of a document using said document output device;
   automatically analyzing said document finishing instructions and identifying areas of said pages of said document that will be unusable after a finishing operation according to said document finishing instructions;
   receiving selection, on a user interface of said document output device, to print an image shift template on said pages of said document, said image shift template comprising lines representing x- and y-axes associated with said document and lines indicating said areas of said pages of said document that will be unusable after said finishing operation according to said document finishing instructions;
   creating a second print job comprising said pages of said document with said image shift template superimposed on said pages of said document using said document output device; and printing, on said document output device, said pages of said document including said image shift template, according to said second print job.

2. The method according to claim 1, printed pages of said document including said image shift template indicating a direction and an amount to shift an image on a page of said document to avoid said areas of said pages that will be unusable after said finishing operation according to said document finishing instructions.

3. The method according to claim 1, further comprising:
shifting an image on a page of said document according to said image shift template to produce an image-shifted document.

4. The method according to claim 3, further comprising:
creating a final print job comprising the pages of said image-shifted document without said image shift template superimposed on said pages of said image-shifted document; and
printing said image-shifted document according to said final print job, using said document output device.

5. The method according to claim 1, said image shift template further comprising one of:
calibrated scales along each of said x- and y-axes,
labels indicating said x- and y-axes,
arrows indicating positive and negative direction along each axis, and
page numbers indicating pages of said document.

6. The method according to claim 1, said finishing operation hiding a portion of said areas of said pages of said document that will be unusable by one of:
gluing,
bonding,
stapling,
binding, and
cutting.

7. The method according to claim 1, further comprising:
selecting said image shift template based on one of:
page size, and
page orientation.

8. A computer-implemented method, comprising:
receiving a first print job into a processor of a document output device, said first print job comprising document finishing instructions and instructions for printing pages of said document using a print engine of said document output device;
displaying, on a user interface operatively connected to said processor, images of pages of said document according to said first print job;
receiving, on said user interface, direction to display an image shift template superimposed on said images of said pages of said document;
responsive to said receiving said direction to display an image shift template superimposed on said images of said pages of said document, said processor analyzing said document finishing instructions and identifying areas of said pages of said document that will be unusable after a finishing operation according to said document finishing instructions;
displaying, on said user interface, images of said pages of said document with said image shift template superimposed on said images of said pages of said document, said image shift template comprising lines representing x- and y-axes associated with said document and lines indicating said areas of said pages of said document that will be unusable after said finishing operation according to said document finishing instructions, said x- and y-axes comprising calibrated scales along each axis and arrows indicating positive and negative direction along each axis;
creating, using said processor, a second print job, said second print job comprising said pages of said document with said image shift template superimposed on said pages of said document, using said print engine of said document output device; and
printing at least a portion of said document with said image shift template, using said document output device, according to said second print job.

9. The computer-implemented method according to claim 8, printed pages of said document including said image shift template indicating a direction and an amount to shift an image on a page of said document to avoid said areas of said pages that will be unusable after said finishing operation according to said document finishing instructions.

10. The computer-implemented method according to claim 8, further comprising:
shifting an image on a page of said document according to said image shift template to produce an image-shifted document, using said processor.

11. The computer-implemented method according to claim 10, further comprising:
creating a final print job, using said processor, said final print job comprising the pages of said image-shifted document without said image shift template superimposed on said pages of said image-shifted document; and
printing said image-shifted document, using said document output device, according to said final print job.

12. The computer-implemented method according to claim 8, said image shift template further comprising one of:
calibrated scales along each of said x- and y-axes,
labels indicating said x- and y-axes,
arrows indicating positive and negative direction along each axis, and
page numbers indicating pages of said document.

13. The computer-implemented method according to claim 8, said finishing operation hiding a portion of said areas of said pages of said document that will be unusable by one of:
gluing,
bonding,
stapling,
binding, and
cutting.

14. The computer-implemented method according to claim 8, further comprising:
selecting said image shift template based on one of:
page size, and
page orientation.

15. A printing device comprising:
a processor;
a print engine operatively connected to said processor; and
a user interface operatively connected to said processor,
said processor receiving a first print job into said printing device, said first print job comprising instructions for printing pages of a document using said printing device and document finishing instructions,
said processor analyzing said document finishing instructions and identifying areas of said pages of said document that will be unusable after a finishing operation according to said document finishing instructions, said processor receiving, from said user interface, selection to print an image shift template on said pages of said document, said image shift template comprising lines representing x- and y-axes associated with said document and lines indicating said areas of said pages of said document that will be unusable after said finishing operation according to said document finishing instructions, said processor creating a second print job comprising said pages of said document with said image shift template superimposed on said pages of said document using said printing device, and said processor directing said print engine to print at least a portion of said pages of said document including said image shift template, according to said second print job.

16. The printing device according to claim 15, further comprising:

said processor receiving, using said user interface, parameters to shift an image on a page of said document according to said image shift template; and said processor shifting said image on said page of said document according to said parameters, producing an image-shifted document.

17. The printing device according to claim 16, further comprising:

said processor creating a final print job comprising the pages of said image-shifted document without said image shift template superimposed on said pages of said image-shifted document; and said processor directing said print engine to print at least a portion of said pages of said image-shifted document according to said final print job.

18. The printing device according to claim 15, said image shift template further comprising one of:

calibrated scales along each of said x- and y-axes, labels indicating said x- and y-axes, arrows indicating positive and negative direction along each axis, and page numbers indicating pages of said document.

19. The printing device according to claim 15, said finishing operation hiding a portion of said areas of said pages of said document that will be unusable by one of:

gluing, bonding, stapling, binding, and cutting.

20. The printing device according to claim 15, further comprising:

said processor receiving, from said user interface, selection of said image shift template based on one of:

page size, and page orientation.

* * * * *